United States Patent [19]

Davidson et al.

[11] Patent Number: 4,812,301

[45] Date of Patent: Mar. 14, 1989

[54] PRODUCTION OF TITANIUM NITRIDE, CARBIDE, AND CARBONITRIDE POWDERS

[75] Inventors: Charles F. Davidson, Layton; Monte B. Shirts, South Jordan; Donna D. Harbuck, Salt Lake City, all of Utah

[73] Assignee: The United States of America as represented by the Secretary of the Interior, Washington, D.C.

[21] Appl. No.: 855,276

[22] Filed: Apr. 24, 1986

[51] Int. Cl.$^4$ .................................................. C01B 31/34
[52] U.S. Cl. ...................................... 423/440; 423/411
[58] Field of Search .................................. 423/411, 440

[56] References Cited

U.S. PATENT DOCUMENTS

| | | | |
|---|---|---|---|
| 2,672,400 | 3/1954 | Jacobsen | 423/411 |
| 3,661,523 | 5/1972 | Sheppard et al. | 423/440 |
| 3,761,576 | 9/1973 | Groening | 423/440 |
| 3,979,500 | 9/1976 | Sheppard et al. | 423/411 X |
| 4,606,902 | 8/1986 | Ritter | 423/440 X |

*Primary Examiner*—Patrick Philip Garvin
*Attorney, Agent, or Firm*—E. Philip Koltos

[57] ABSTRACT

A process for producing substantially oxygen-free titanium carbide, nitride or carbonitride in powder form comprises treating a gas phase reaction mixture of titanium halide, desirably TiCl$_4$, a reductant vapor, desirably sodium or magnesium, and a reactive gas capable of furnishing carbon, nitrogen or mixtures thereof at the reaction temperature, desirably nitrogen, methane or ammonia, to a temperature in the range from 500° to 1250° C., preferably 800° to 1100° C., whereby the titanium halide is substantially simultaneously reduced and carbided, nitrided or carbonitrided. The process may also be practiced using volatile metal halides of metals such as zironium, hafnium, vanadium, niobium, tantalum and silicon for forming substantially oxygen-free carbides, nitrides or carbonitrides thereof in powder form.

7 Claims, No Drawings

PRODUCTION OF TITANIUM NITRIDE, CARBIDE, AND CARBONITRIDE POWDERS

FIELD OF THE INVENTION

The present invention relates generally to a process for the production of titanium nitride, carbide, and carbonitride powders and, more particularly, to a gas phase process for producing finely divided, high purity powders.

BACKGROUND OF THE INVENTION

Conventional cemented carbide alloy machine tools and abrasion resistant component parts are produced by press molding a predominantly tungsten carbide powder composition and sintering the resulting molded mass by powder metallurgy techniques. However, because of the limited availability of tungsten ore, sintered alloys made therefrom are relatively expensive. To reduce the extent of tungsten carbide usage and in order to modify the properties of these alloys, titanium compounds have been alloyed with tungsten carbide. Moreover, titanium compounds, such as titanium nitride, carbide and carbonitride appear to have properties, such as hardness, melting point, and density, equivalent or comparable to the properties of tungsten carbide which would make them useful and desirable in lieu of tungsten carbide as cutting tool materials. However, titanium compound alloys have not met with the success and acceptance that might have been expected primarily because of inconsistency in the quality of the starting material titanium compound powders.

Wear resistant coatings of titanium carbide and nitride have been used successfully for many years. These materials are known to improve the cutting tool performance of tungsten carbide in metal machining applications. Such coatings are produced primarily by two methods: (1) chemical vapor deposition, and (2) physical vapor deposition or sputtering. Even though these methods produce very pure coating materials, they cannot produce usable quantities of powder. Only thin coatings on solid materials can be made. Moreover, the coating process is very slow and requires precise control over the reaction conditions. To the extent that powder is formed, it occurs only as a secondary reaction.

Methods to produce titanium nitride, carbide and carbonitride powders have basically used three general approaches: (i) reactions using plasma, (ii) reactions using $TiO_2$ and similar materials, and (iii) reactions using titanium halide, such as $TiCl_4$, and a nitrogen or carbon containing gas.

Plasma reactions are based on reducing stable titanium compounds with hydrogen in the presence of a reactive gas. The plasma processes usually produce very fine powders. Some processes react pure titanium powder in the plasma and rely on the increased rate of reaction at high temperature to form the nitride or carbide powder. However, due to the high temperatures used, special equipment is needed to contain the reaction. Plasma generation is very energy intensive and, therefore, expensive to operate. Moreover, these processes have limited feed rates, thus limiting production.

The oldest processes for making titanium carbide and nitride use particulate $TiO_2$ or similar materials as starting reactants. These reactions depend on reducing $TiO_2$ with carbon in a nitrogen atmosphere if TiN is the desired product or with excess carbon if TiC is the desired product. Such reactions are typically very slow, requiring up to 10 to 20 hours for completion. A coarse powder is produced which requires milling to obtain the proper particles size and distribution. Moreover, because oxygen is part of the starting material, it always contaminates the final product. For example, in U.S. Pat. No. 1,391,147, von Bichowsky et al disclose a process of synthesizing titanium nitride by forming ground titanium dioxide, carbon, an alkali metal salt and metallic iron into briquette form, drying in an oxygen free environment and heating at 1000° C. in a stream of nitrogen gas. In U.S. Pat. No. 3,036,888, Lowe teaches a method for producing titanium nitride by admixing particulate titanium dioxide and titanium carbide and heating the finely divided mixture at temperatures above 1500° C. while a stream of nitrogen is passed therethrough. In U.S. Pat. No. 2,819,152, Aagaard discloses a method for forming titanium carbide from a starting titanium sulfate solution by hydrolyzing the sulfate solution in the presence of finely divided carbon particles, treating the resulting hydrated titanium compound/carbon coalesced particulate mixture with an alkaline metal hydroxide and calcining the treated mixture.

Several processes have been proposed based on the reaction between $TiCl_4$ and $NH_3$ or $N_2$. These reactions require very high temperatures to nucleate the powder in free space. Very poor conversions are obtained even at temperatures above 1,300° C. If reactions are conducted at lower temperatures, nonstoichiometric compounds are formed. To date, there are no commercial processes using this approach. Exemplary of this type process is U.S. Pat. No. 2,606,815 -- Sowa in which titanium nitride is prepared by forming the addition compound of titanium tetrachloride and ammonia, adding aqueous sodium fluoride and sodium hydroxide thereto to render the solution alkaline and to form a gelatinous precipitate, filtering and drying the precipitate, and fusing the dry material at 750°–850° C. to yield titanium nitride. In another process disclosed in U.S. Pat. No. 3,615,271 - Dietz, titanium carbonitride powder is made by reacting liquid titanium tetrachloride and a stoichiometric excess of an ethylamine in an inert atmosphere at temperatures up to 136° C., heating the reaction product to about 600° C. in an atmosphere of ammonia or methylamine, increasing the temperature to about 900° C. in an atmosphere of hydrogen alone or combined with argon, methane or ammonia, and increasing the temperature to 1200° C. in an argon atmosphere. According to still another process for preparing titanium carbonitride in powder form disclosed in U.S. Pat. No. 4,247,529 - Mori et al, a powdered mixture of titanium di- or tri-halide and carbon is heated to 700° to 1800° C. in the presence of a powdered aluminum or aluminum-titanium reducing agent in a nitrogen, nitrogen-hydrogen or ammonia gaseous atmosphere.

A recent process disclosed by Holt in U.S. Pat. No. 4,446,242, which produces titanium nitride or carbonitride uses metallic titanium as a starting material. In this process, Ti is mixed with $NaN_3$ and ignited in a $N_2$ atmosphere. However, in order to produce a fine-titanium nitride, a fine-titanium powder is necessary. Oxygen contamination is inherent in fine-titanium powder and, therefore, carries over into the TiN. Also detracting from the desirability of the process if the fact that sodium azide is an expensive material which is difficult to produce in pure form.

Another process, taught in U.S. Pat. No. 2,672,400 - Jacobson, forms titanium nitride by reducing TiCl4 with sodium to give a molten mixture of TiCl2 and NaCl and adding ammonia to the molten mixture to complete the reduction and nitride the resulting titanium at temperatures in the range 600° to 850° C. Thermodynamically, H2 cannot reduce TiCl2 at temperatures between 50020 and 1000° C. This makes the last step in the process very slow and obtaining a homogeneous product that is completely reacted is difficult. Moreover, this process, as described, is a batch reaction with multiple steps which increase its complexity and cost.

It is, therefore, apparent that there exists a need in the art for a rapid, efficient and economical process for producing very finely divided titanium nitride, carbide and carbonitride powders of excellent purity and composition. Accordingly, it is the purpose of the present invention to provide such a process which is very rapid, going to completion within seconds, easily automated, readily operated on a continuous basis, and affords control over the composition of mixed carbon-nitrogen compounds. The process of the present invention produces homogeneous, fine grain low-oxygen, stoichiometric composition powders of titanium carbide, nitride and carbonitride which can be used to make hard abrasion resistant materials for sintered tools or for blending with other alloying elements for making ceramic components.

SUMMARY OF THE INVENTION

In one broad aspect of the present invention this is accomplished by providing a process for the simultaneous reduction and nitriding of a volatile metal halide in the gas phase to produce very finely divided low-oxygen containing metal nitrides, carbides and carbonitrides of excellent purity and composition.

In another aspect of the invention this is accomplished by providing a process wherein the gas phase reaction takes place at temperatures in the broad range 500° to 1250° C.; the reduction phase is accomplished using a reductant selected from the active alkali metals and alkaline earth metals in quantities of 75 to 200 percent by weight of the stoichiometric amount needed to reduce the volatile metal halide, e.g., TiCl4; and the nitriding, carbiding or carbonitriding phase is accomplished using a carbon or nitrogen providing reactive gas, such as nitrogen, methane, ammonia, and the like, in quantities of from one to ten times the stoichiometric amount needed for reaction.

In a most preferred aspect of the invention the volatile metal halide is TiC;4 which is preferably reacted in the gas phase at temperatures in the range 800° to 1100° C. with a reductant such as sodium or magnesium and a reactive gas such as nitrogen and/or methane to produce very fine grain, low-oxygen containing TiN, TiC and TiCN.

DETAILED DESCRIPTION OF THE PREFERRED EMBODIMENT

The present invention is directed to the preparation of homogeneous, very fine grain (less than about 1 micron) metal nitride, carbide and carbonitride powders having very high purity, low oxygen content and stoichiometric compositions. These powders are extremely valuable in making hard abrasion resistant materials and for blending with other alloying elements in making ceramic components useful, for example, in applications requiring high temperature and/or corrosion resistance.

In accordance with the present invention, these desirable metal nitride, carbide and carbonitride powders may be produced by the simultaneous reduction and nitriding or volatile metal halides in the gas phase in the presence of a gaseous reductant and a reactive nitrogen and/or carbon supplying gas. In its broadest application, any of the volatile metal halides can be used. Such metals include titanium, zirconium, hafnium, vanadium, niobiom, tantalum, silicon, and the like, although the reduction and nitriding of titanium halides, such as TiCl4, to produce fine grain TiC, TiN and TiCN powders is of greatest commercial interest at this time. The reductant gas can be advantageously selected from any of the active alkali and alkaline earth metals, although it will be appreciated that certain of these reductants, sodium and magnesium, are clearly preferred from the standpoint of availability and cost and because they have the highest vapor pressure of the available metals. Any reactive gas capable of furnishing carbon or nitrogen, as desired, under the reaction conditions specified herein is suitable as the carbon and/or nitrogen source. However, as with the reductant, considerations such as availability and cost make the use of such gases as nitrogen, methane, ammonia, and the like, more desirable than others.

The gas phase reaction of the present invention may be practiced at various temperatures in the range 500° to 1250° C., preferably 800° to 1100° C. The reaction temperature determines the reductant vapor pressure which, in turn, determines the allowable reactant feed rate. Higher reaction temperatures yield higher vapor pressures, allowing greater feed rates. The time necessary for complete reaction of the gas phase metal halide, reductant and reactive gas is only seconds; however, longer times can be employed. The total gas flow rate and the reactor volume determine the length of time the reaction products are in the reactor. The volatile metal halide and the reductant, as well as the powder product, are desirably carried into and through the reactor by an inert gas with the product carried into a water scrubber or other collection chamber from which is can be readily recovered in a conventional and well known manner.

It has been found that the simultaneous reduction and nitriding of TiCl4 in the gas phase will produce very finely divided TiN, TiC and TiCN of excellent purity and composition. Magnesium and sodium can reduce TiCl4 and both are used commercially to produce Ti metal. Since these metals have low boiling points, they have high-vapor pressures in the temperature range at which the reaction of the present invention is desirably conducted. The gas-phase reduction of TiCl4 with Mg or Na gives very fine, extremely reactive titanium powder. This powder reacts rapidly with any reactive gas in the system such as nitrogen, methane, ammonia, etc., to form the desired TiN, TiC, or TiCN powder. Because none of the reactants contain oxygen, the reaction products derive no oxygen from the reactants. Moreover, because of the stability of the carbides and nitrides, the reaction products are almost completely inert to oxidation. As a consequence, the reaction products are substantially oxygen free.

Reactions illustrating the practice of the present invention with titanium are described by the following equations:

Nitride formation:

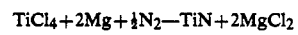

$$TiCl_4 + 4Na + \tfrac{1}{2}N_2 \rightarrow TiN + 4NaCl$$

Carbide formation:

$$TiCl_4 + 2Mg + CH_4 \rightarrow TiC + 2MgCl_2 + 2H_2$$

$$TiCl_4 + 4Na + CH_4 \rightarrow TiC + 4NaCl + 2H_2$$

Carbonitride formation:

$$TiCl_4 + 2Mg + CH_4 + \tfrac{1}{2}N_2 \rightarrow TiCN + 2MgCl_2 + 2H_2$$

$$TiCl_4 + 4Na + CH_4 + \tfrac{1}{2}N_2 \rightarrow TiCN + 4NaCl + 2H_2$$

When the gas phase reaction of the present invention is conducted within the 500° to 1250° C. temperature range, the reductant gas should be present in an amount corresponding to 75 to 200 percent by weight, preferably 110 to 150 percent by weight, of that stoichiometrically needed to reduce the halide. The reactive gas supplying the carbon or nitrogen should be present in an amount from 100 to 1000 percent by weight (1 to 10 times), preferably 200 to 400 percent by weight (2 to 4 times), of that stoichiometically needed for the reaction. It will be appreciated, however, that where both carbon and nitrogen supplying gases are employed in the production of a metal carbonitride, the relative proportions of carbide and nitride can be controlled by controlling the relative amounts of carbon and/or nitrogen supplying gas in the reaction mixture.

The chloride salts produced by the reaction are easily leached away from the desired powder product with either water or dilute acid in a conventional manner. The metal carbide, nitride or carbonitride powder can then be filtered and dried to give a pure material having a particle size in the range 0.1 to 0.5 microns as determined by SEM micrographs. In this connection it should be appreciated that the reactive metal, such as titanium, is extremely reactive towards any oxygen, and any metallic titanium will pick up oxygen. However, since the reaction of the present invention does not use oxygen-containing starting materials and inasmuch as there is no exposure to oxygen during processing, the reaction product metal carbide, nitride or carbonitride powders are very low in oxygen content. Once the titanium has reacted with the relatively plentiful carbon or nitrogen in the gas phase reaction mix to form stable carbides and/or nitrides, the reaction products are almost totally nonreactive with oxygen. Moreover, inasmuch as the reaction of the present invention produces homogeneous fine grain powders directly, without need for grinding or milling, any contamination of the product powders as a result of a mechanical size reduction process is completely avoided.

The following examples more specifically illustrate the practice of the method of the present invention.

EXAMPLE 1

Magnesium vapor at 0.51 g/min was reacted with TiCl$_4$ vapor at 5.1 g/min at 1000° C. in a vertical stainless-steel tube reactor. Argon was used as a carrier gas for the magnesium and TiCl$_4$. Nitrogen gas was fed into the furnace at four times the stoichiometric amount needed to react with the titanium.

The reaction products were carried through the reactor into a scrubber where they were collected in a 10 percent HCl solution. The powder mixture was then filtered and leached three times in a water solution to remove residual MgCl$_2$. The powder was identified as TiN by X-ray diffraction. Magnesium and chlorine in the powder were both less than 0.1 percent by weight.

EXAMPLE 2

The procedure and equipment used in this example were similar in all respects to that of Example 1 except that sodium vapor at 0.79 g/min and TiCl$_4$ vapor at 3.06 g/min were reacted at a temperature of 800° C. The reaction produced a powder, also identified as TiN, having low-impurity levels.

EXAMPLE 3

The procedure and equipment used in this example were similar in all respects to that of Example 1 except that methane gas at four times the stoichiometric amount was used in place of nitrogen gas. The resulting product was water leached several times and was identified as TiC.

EXAMPLE 4

Magnesium vapor at 0.75 g/min and TiCl$_4$ vapor at 3.15 g/min in an argon carrier were reacted at 1000° C. with a methane-nitrogen mixture in a vertical stainless-steel tube reactor. The amount of nitrogen gas fed to the reactor was based on four times the stoichiometric amount needed to react with the titanium. However, the amount of methane was based on converting 40 percent by weight of the titanium to carbide. After the reaction product was purified by water leaching, the resulting powder was identified as TiCN.

While the present invention has been described with reference to particular embodiments thereof, it will be understood by those skilled in the art that variations and modifications can be effected thereto which fall within the scope of the invention as claimed.

We claim:

1. A process for producing substantially oxygen-free titanium carbide consisting essentially of heating a gas phase reaction mixture of titanium halide, a reductant vapor selected from the class consisting of sodium and magnesium and a reactive gas capable of furnishing carbon at a temperature in the range from 500° to 1250° C., whereby the titanium halide is substantially simultaneously reduced and carbided for producing substantially oxygen-free titanium carbide in powder form having a particle size from about 0.1 to about 0.5 microns; said reductant vapor being present in said reaction mixture in an amount of from 75 to 200 percent by weight of the stoichiometric amount needed to reduce the titanium halide, and said reactive gas being present in said reaction mixture in an amount which is one to ten times the stoichiometric amount needed for reaction.

2. A process, as claimed in claim 1, wherein the gas phase reaction mixture is heated to a temperature in the range 800° to 1100° C.

3. A process, as claimed in claim 1, wherein said reactive gas is methane.

4. A process, as claimed in claim 1 wherein said reductant is present in said reaction mixture in an amount which is 110 to 150 percent by weight of the stoichiometric amount needed to reduce the titanium halide.

5. A process, as claimed in claim 1 wherein said reactive gas is present in said reaction mixture in an amount which is two to four times the stoichiometric amount needed for reaction.

6. A process, as claimed in claim 1, wherein said titanium halide is TiCl$_4$, said reactive gas is methane and said reductant is present in said reaction mixture in an amount which is 75 to 200 percent by weight of the stoichiometric amount needed to reduce the titanium halide and said reactive gas is present in said reaction mixture in an amouned which is one to ten times the stoichiometric amount needed for reaction.

7. A process, as claimed in claim 1, including the steps of separating the reaction product carbide powder from the reaction product chloride salts.

* * * * *